United States Patent [19]

Yamasaki et al.

[11] Patent Number: 5,322,869
[45] Date of Patent: Jun. 21, 1994

[54] STYRENE-BASED RESIN COMPOSITION AND PROCESS FOR PRODUCTION OF MOLDINGS

[75] Inventors: Komei Yamasaki, Sodegaura; Takashi Sumitomo, Ichihara; Toshikazu Ijitsu, Sodegaura; Hiroshi Yamada, Sodegaura; Toshihiro Furusawa, Sodegaura, all of Japan

[73] Assignee: Idemitsu Kosan Co., Ltd., Tokyo, Japan

[21] Appl. No.: 810,369

[22] Filed: Dec. 18, 1991

Related U.S. Application Data

[63] Continuation of Ser. No. 751,594, Aug. 21, 1991, abandoned, which is a continuation of Ser. No. 364,430, filed as PCT/JP88/do40 on Oct. 12, 1988, abandoned.

[30] Foreign Application Priority Data

Oct. 20, 1987 [JP] Japan ................ 62-262628
Jan. 13, 1988 [JP] Japan ................ 63-003843
Feb. 5, 1988 [JP] Japan ................ 63-023745

[51] Int. Cl.$^5$ ............................................. C08J 3/20
[52] U.S. Cl. ................................. 524/117; 524/396; 524/449; 524/451
[58] Field of Search ............ 524/449, 451, 117, 396

[56] References Cited

U.S. PATENT DOCUMENTS 4,463,113 7/1984 Nakahara .................. 524/117
4,680,353 7/1987 Ishihara et al. .............. 526/160
4,795,782 1/1989 Lutz et al. ..................... 525/66
4,937,272 6/1990 Sumitomo ..................... 521/56

OTHER PUBLICATIONS

Y. Sakura, "Plastics Haigozai-Kiso to Oyo" Taisei-sha, pp. 53-109 with partial translation.

*Primary Examiner*—Joseph L. Schofer
*Assistant Examiner*—Peter D. Mulcahy
*Attorney, Agent, or Firm*—Oblon, Spivak, McClelland, Maier & Neustadt

[57] ABSTRACT

Styrene-based resin composition containing as main components (A) 100 parts by weight of a styrene-based polymer having mainly a syndiotactic configuration and (B) 0.01 to 25 parts by weight of one or more nucleating agents selected from the group consisting of (1) metal salts of organic acids having an average particle diameter of not more than 50 $\mu$m, (2) inorganic compounds having an average particle diameter of not more than 50 $\mu$m, (3) organophosphorus compounds having an average particle diameter of not more than 50 $\mu$m, and (4) metal salts of ionic hydrocarbon copolymer, and a process for producing styrene-based resin moldings by molding the above styrene-based resin composition at a temperature between room temperature and 200° C. The resin composition of the present invention is suitable for injection molding and extrusion molding, and provides moldings which are of high crystallinity and are excellent in heat resistance, solvent resistance, chemical resistance and so forth.

9 Claims, No Drawings

STYRENE-BASED RESIN COMPOSITION AND PROCESS FOR PRODUCTION OF MOLDINGS

This application is a continuation of application Ser. No. 07/751,594, filed Aug. 21, 1991 (abandoned) which is a continuation of Ser. No. 07/364,430 filed May 18, 1989 (abandoned) which is the U.S. designated application of PCT/JP88/01040 filed Oct. 12, 1988.

TECHNICAL FIELD

The present invention relates to a styrene-based resin composition and a process for production of moldings. More particularly, it is concerned with a styrene-based resin composition comprising a styrene-based polymer having a syndiotactic configuration and a specified nucleating agent blended thereto, and a process for producing styrene-based resin moldings excellent in physical properties such as heat resistance and solvent resistance by molding the above resin composition at a low temperature.

BACKGROUND ART

Styrene-based polymers produced by radical polymerization and so forth have atactic configuration and are widely used in home electrical appliances, office appliances, home tools, wrapping containers, furniture, synthetic paper, and other industrial materials by molding using techniques such as injection molding, extrusion molding, blow molding, vacuum molding and casting molding.

The styrene-base polymers having atactic configulation, however, have the disadvantages of being poor in mechanical strength, heat resistance and chemical resistance, because the styrene-based polymers do not undergo crystallization.

The present inventors' group have succeeded in producing styrene-based polymers of high syndiotacticity and developed compositions containing these high syndiotacticity styrene-based polymers (see U.S. Pat. No. 4,680,353 and Japanese Patent Application Laid-Open Nos. 104818/1987, 257948/1987 and 257950/1987). These syndiotactic styrene-based polymers or their compositions are excellent in mechanical strength, heat resistance, solvent resistance, electrical characteristics and so forth as compared with atactic styrene-based polymers or their compositions. In molding the syndiotactic styrene-based polymers or their compositions, however, a high molding temperature is needed to crystallize the syndiotactic styrene-based polymers. Moreover, the syndiotactic styrene-based polymers have a low crystallization rate at low temperatures and thus suffer from the disadvantages that the molding cycle is long and flash is readily formed, even if the molding is in a mold maintained at a high temperature.

DISCLOSURE OF INVENTION

An object of the present invention is to efficiently produce moldings having excellent physical properties using a styrene-based polymer having a syndiotactic configuration.

Another object of the present invention is to provide materials for production of the above moldings with excellent physical properties.

The present invention relates to a styrene-based resin composition containing as main components; (A) 100 parts by weight of a styrene-based polymer having mainly a syndiotactic configuration and (B) 0.01 to 25 parts by weight of one or more nucleating agents selected from the group consisting of (1) metal salts of organic acids having an average particle diameter of not more than 50 $\mu$m, (2) inorganic compounds having an average particle diameter of not more than 50 $\mu$m, (3) organophosphorus compounds having an average particle diameter of not more than 50 $\mu$m, and (4) metal salts of ionic hydrocarbon copolymers.

The present invention further relates to a process for producing a styrene-based resin molding which comprises molding the above styrene-based resin composition at a temperature between room temperature and 200° C.

BEST MODE FOR CARRYING OUT THE INVENTION

The resin composition of the present invention contains the components (A) and (B) as main components. The styrene-based polymer having mainly a syndiotactic configuration means a polymer having the stereo regularityl that is mainly syndiotactic, i.e., the stereo regularity in which phenyl groups or substituted phenyl groups as side chains are located alternately at the opposite positions relative to the main chain comprising carbon-carbon bonds. The tacticity is quantitatively determined by the nuclear magnetic resonance method using carbon isotope ($^{13}$C-NMR method). The tacticity as determined by the $^{13}$C-NMR method is indicated in terms of the proportion of a plurality of continuing constitutional units, for example; a diad in which two constitutional units are linked together, a triad in which three constitutional units are linked together, and a pentad in which five constitutional units are linked together. Styrene-based polymers having mainly the syndiotactic configuration as used herein includes; polystyrene, poly(alkylstyrene), poly(halogenated styrene), poly(alkoxystyrene), poly(vinylbenzoic acid ester) and their mixtures and copolymers containing the above monomers as the main component, with the syndiotacticity that the diad is at least 75% and preferably at least 85%, or the pentad (racemic pentad) is at least 30% and preferably at least 50%.

The poly(alkylstyrene) includes poly(methylstyrene), poly(ethylstyrene), poly(isopropylstyrene), and poly(tert-butylstyrene). The poly(halogenated styrene) includes poly(chlorostyrene), poly(bromostyrene), and poly(fluorostyrene). The poly(alkoxystyrene) includes poly(methoxystyrene) and poly(ethoxystyrene). Particularly preferred styrene-based polymers are polystyrene, poly(p-methylstyrene), poly(m-methylstyrene), poly(p-tert-butylstyrene), poly(p-chlorostyrene), poly(m-chlorostyrene), poly(p-fluorostyrene), poly(p-bromostyrene), and a copolymer of styrene and p-methylstyrene.

The styrene-based polymers to be used in the present invention are not critical in molecular weight. The weight average molecular weight is preferably at least 10,000 and more preferably at least 50,000. The styrene-based polymers are not critical in molecular weight distribution. If the weight average molecular weight is less than 10,000, the resulting composition or molding is undesirably reduced in thermal and mechanical properties.

The styrene-based polymers having mainly syndiotactic configuration can be produced by polymerizing styrene-based monomers (corresponding to the styrene-based polymers) in the presence or absence of a solvent, e.g., an inert hydrocarbon solvent by the use of a catalyst comprising a titanium compound and a condensation product of water and trialkylaluminum (see U.S. Pat. No. 4,680,353 and Japanese Patent Laid-Open No. 187708/1987).

The component (B) of the resin composition of the present invention is a nucleating agent. As the nucleating agent, various compounds capable of accelerating the crystallization rate of the styrene-based polymer as the component (A) can be used. Preferred examples of the component (B) are (1) metal salts of organic acids having an average particle diameter of not more than 50 μm, (2) inorganic compounds having an average particle diameter of not more than 50 μm, (3) organophosphorus compounds having an average particle diameter of not more than 50 μm, and (4) metal salts of ionic hydrocarbon copolymers. These compounds can be used alone or in combination with each other.

Examples of (1) the metal salts of organic acids are the metal (e.g., sodium, calcium, aluminum, magnesium and the like) salts of organic acids such as benzoic acid, p-(tert-butyl)-benzoic acid, cyclohexanecarboxylic acid hexahydrobenzoic acid), aminobenzoic acid, β-naphthoenic acid, cyclopentanecarboxylic acid, succinic acid, diphenylacetic acid, glutaric acid, isonicotinic acid, adipic acid, sebacic acid, phthalic acid, isophthalic acid, benzensulfonic acid, glucolic acid, caproic acid, isocaproic acid, phenylacetic acid, cinnamic acid, lauric acid, myristic acid, palmitic acid, stearic acid, oleic acid and the like. Of these compounds, aluminum p-(tert-butylbenzoate, sodium cyclohexanecarboxylate, sodium β-naphthoenate and the like are particularly preferred.

Examples of (2) the inorganic compounds are carbon black, graphite, titanium dioxide, silica, talc, mica, asbestos, zinc white, clay, calcium carbonate, calcium sulfate, barium carbonate, barium sulfate, magnesium carbonate, tin oxide, antimmony oxide, magnesium sulfate, quartz, dolomite, alumina and kaolin. These inorganic compounds can be used alone or in combination with each other. Of these compounds, mica, titanium dioxide, silica, talc and kaolin are preferably used.

As (3) the organophosphorus compound, for example, organophosphorus compounds (b₁) represented by the general formula:

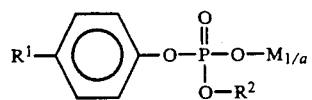
[B-I]

(wherein $R^1$ is a hydrogen atom or an alkyl group having 1 to 18 carbon atoms, $R^2$ is an alkyl group having 1 to 18 carbon atoms,

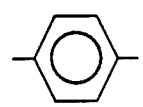

$R^1$, or $M_{1/a}$ (wherein M is Na, K, Mg, Ca or Al and a is an atomic valency of M)), and organophosphorus compounds (b₂) represented by the general formula:

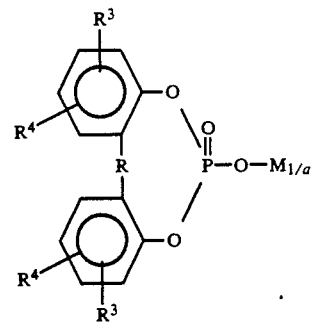
[B-II]

(wherein R is a methylene group, an ethylidene group, a propylidene group or an isopropylidene group, $R^3$ and $R^4$ are each a hydrogen atom or an alkyl group having 1 to 6 carbon atoms, and M and a are the same as defined above) can be used.

The chemical formulas of representative examples of the organophosphorus compounds (b₁) represented by the general formula (B-I) are shown below.

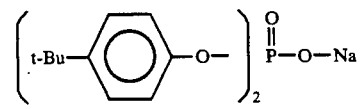

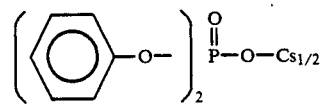

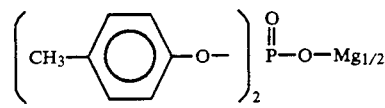

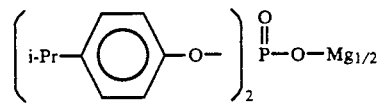

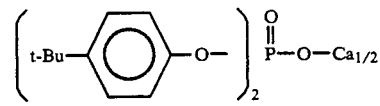

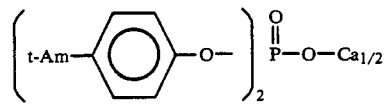

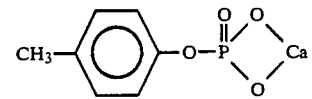

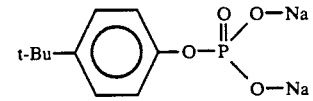

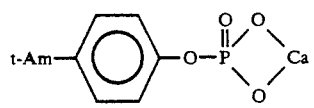

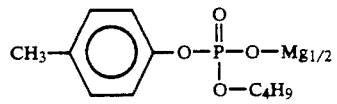

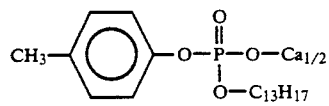

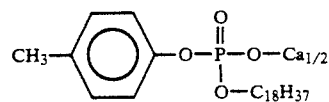

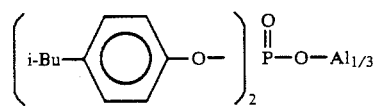

In the general formula (B-II), $R^3$ and $R^4$ are each a hydrogen atom or an alkyl group having 1 to 6 carbon atoms, Examples of the alkyl group are a methyl group, an ethyl group, an isopropyl group, a n-butyl group, an isobutyl group, a sec-butyl group, a tert-butyl group, a n-amyl group, a tert-amyl group, and a hexyl group.

The chemical formulas of representative examples of the organophosphorus compounds ($b_2$) are shown below.

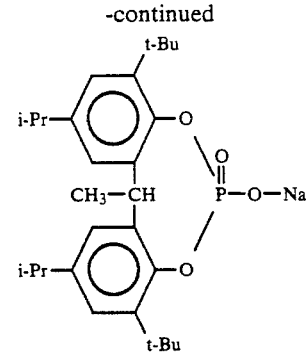

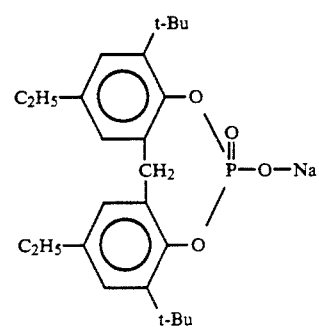

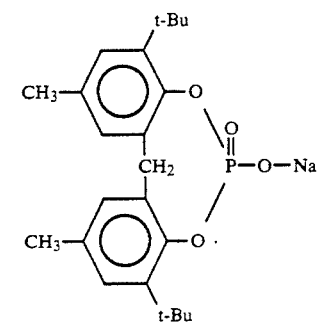

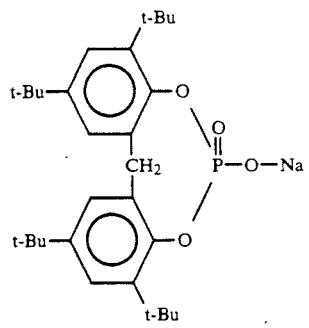

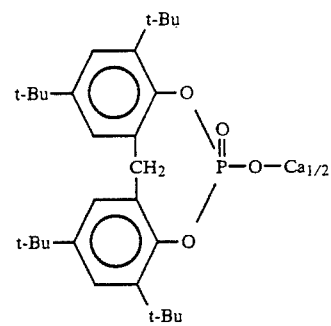

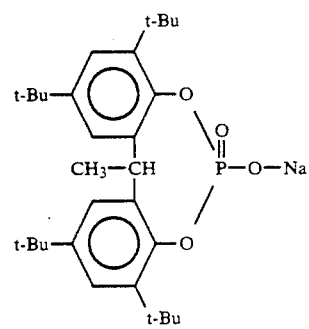

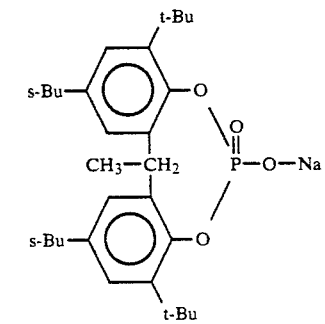

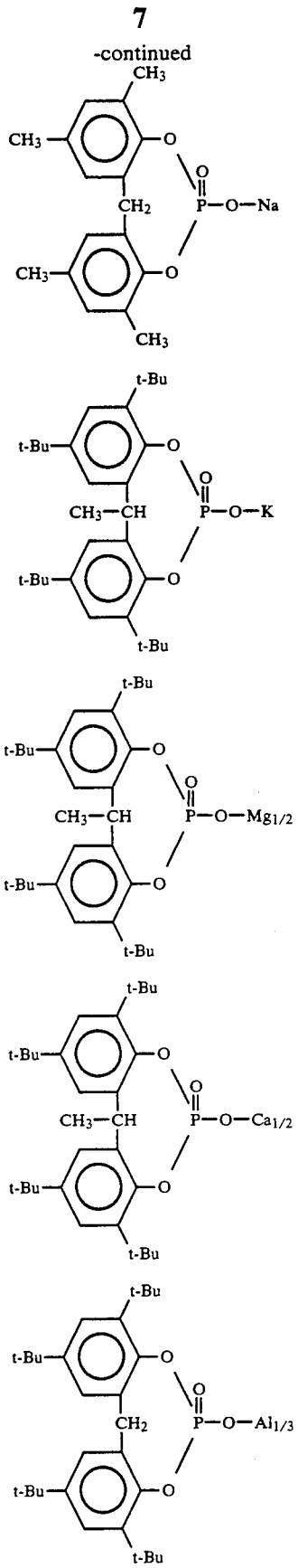

The average particle diameter of (1) the metal salts of organic acids, (2) the inorganic compounds and (3) the organophosphorus compounds is not more than 50 μm, preferably not more than 30 μm, and particularly preferably 0.05 to 10 μm. If the particle diameter of the compounds (1), (2) or (3) is more than 50 μm, the compounds tend to cause poor appearance and drop of mechanical strength in the resulting composition. If it is less than 0.05 μm, the compounds may not act as a nucleus for crystallization.

Typical examples of ionic hydrocarbon copolymers for (4) the metal salts of ionic hydrocarbon copolymers are copolymers of olefin (e.g., ethylene, propylene, butylene, styrene, and α-methylstyrene) and unsaturated carboxylic acids (e.g., acrylic acid, methacrylic acid, and malenic acid) or unsaturated carboxylic anhydride (e.g., maleic anhydride). Typical examples of metal ions constituting the ionic hydrocarbon copolymer metal salts are alkali metal ion such as sodium ion and potassium ion, alkali earth metal ion such as magnesium ion, calcium ion and barium ion, and aluminum ion, and zinc ion.

The melt index (MI) of the ionic hydrocarbon copolymer metal salt is usually not more than 100 g/10 min and preferably 0.01 to 50 g/10 min.

The above ionic hydrocarbon copolymer metal salts can be prepared by various methods, such as a method in which an ionic hydrocarbon copolymer is neutralized with a base containing the above metal ion, and a method in which unsaturated carboxylic acid neutralized with the above metal ion or its anhydride is copolymerized with the above olefin.

In the composition of the present invention, the component (B) is blended in an amount of 0.01 to 25 parts by weight per 100 parts by weight of the component (A). If the amount of the component (B) blended is less than 0.01 by weight, the effect of accelerating the crystallization of the composition is barely obtained. On the other hand, if it is in excess of 25 parts by weight, the composition or its molding is reduced in heat resistance and chemical resistance, and is unsuitable for practical use.

The suitable amount of the component (B) blended somewhat varies with the type of the compound to be used as the component (B). In a case where (1) the organic acid metal salt having an average particle diameter of not more than 50 μm or (3) the organophosphorus compound having an average particle diameter of not more than 50 μm is used as the component (B), the suitable amount of the component (B) blended is 0.02 to 15 parts by weight per 100 parts by weight of the component (A), and an amount with in the range of 0.05 to 5 parts by weight is most preferable.

In a case where (2) the inorganic compound having an average particle diameter of not more than 50 μm is used as the component (B), the suitable amount of the component (B) blended is 0.02 to 10 parts by weight per 100 parts by weight of the component (A), and an amount with in the range of 0.1 to 2 parts by weight is most preferable.

In a case where (4) the ionic hydrocarbon copolymer metal salt is used as the component (B), the suitable amount of the component (B) blended is 0.1 to 25 parts by weight per 100 parts by weight of the component (A), and an amount with in the range of 0.5 to 12 parts by weight is most preferable Among the component (B), (1) the organic acid metal salt is most preferable, and followed by (2) the inorganic compound and (3) the organophosphorus compound in this order.

The composition of the present invention contains the above components (A) and (B) as the main components.

If necessary, various additives such as; an antioxidant, a fibrous reinforcing agent (e.g., glass fiber and carbon fiber), a plasticizer, a lubricant, a thermoplastic resin, and rubber can be blended to the composition.

The composition of the present invention can be prepared by blending the components (A) and (B) and other additives, and then mixing them at room temperature or melt kneading them by the use of a kneader, a mixing roll, an extruder and the like, although the present invention is not limited thereto.

In accordance with the process of the present invention, the above styrene-based resin composition is molded at a die temperature (molding temperature) of room temperature to 200° C., preferably 60° to 160° C. Although the temperature of the resin composition in molding is not critical, it is generally preferred that the composition be melted by heating at a temperature of about 260° to 350° C. The molding method is chosen according to the type of the molding to be produced. Various molding methods can be employed such as; heat molding as commonly employed in molding of the conventional atactic styrene-based polymers, press molding, injection molding, extrusion molding, blow molding, vacuum molding, molding in situ, cast molding, flow molding, cover molding, spinning, coating (e.g., dipping, brush coating, and spray coating), uniaxial stretching, and biaxial stretching (sequential or simultaneous).

The present invention is described in greater detail with reference to the following examples.

REFERENCE EXAMPLE 1

Production of Polystyrenes having mainly Syndiotactic Configuration

2 L (L=liter) of toluene, and 1 mmol (millimole) of cyclopentadineyltitanium trichloride and 0.8 mol (as aluminum atom) of methylaluminoxane as catalyst components were placed in a reactor, and 3.6 L of styrene was added and polymerized at 20° C. for 1 hour. After polymerization, the reaction product was washed with a mixture of hydrochloric acid and methanol to decompose the catalyst components, and then dried to obtain 330 g of a polymer. The polymer was subjected to Soxhlet extraction using methyl ethyl ketone as a solvent to obtain 95% by weight of an extraction residue. The polymer had a weight average molecular weight of 290,000, a number average molecular weight of 158,000 and a melting point of 270° C. A nuclear magnetic resonance analysis using carbon isotope ($^{13}$C-NMR method; solvent: 1,2-dichlorobenzene) showed a peak at 145.35 ppm, ascribable to the syndiotactic configuration. The syndiotacticity in terms of racemipentad as calculated from the peak area was 96%.

EXAMPLE 1

100 parts by weight of the syndiotactic polystyrene obtained in Reference Example 1 and 0.1 part by weight of aluminum p-(tert-butyl)benzoate with an average particle diameter of 0.5 μm (trade name, PTBBA-Al, produced by Dainippon Ink Kagaku Kogyo Co., Ltd.) were melt kneaded at 300° C. to prepare a resin composition.

The resin composition was molded by compression method to a thickness of 0.3 mm at 300° C. and quenched in ice water to obtain a transparent press plate.

This compression molded plate was cut into a 3 mm×3 mm square to make a test piece. A crystallization rate of the test piece was measured by a measurement of depolarized light. This measurement was carried out by sandwiching the test piece between two cover glass sheets, melting the test piece for 3 minutes in a melt furnace maintained at 300° C., and measuring the crystallization rate at crystallization temperatures of 80° C. and 150° C.

The above resin composition was injection molded by the use of a minimatt molding machine (manufactured by Sumitomo Juki Co., Ltd.) at a resin composition temperature of 300° C. and a die temperature of 120° C. to make a dumbbell-shaped test piece. At the molding, releasing properties and the appearance of the molding (dumbbell-shaped test piece) were evaluated. The results are shown in Table 1.

EXAMPLE 2

The same procedure as in Example 1 was repeated with the exception that the amount of PTBBA-Al was changed to 0.5 part by weight. The results are shown in Table 1.

EXAMPLE 3

The same procedure as in Example 1 was repeated with the exception that the amount of PTBBA-Al was changed to 4.0 parts by weight. The results are shown in Table 1.

EXAMPLE 4

The same procedure as in Example 2 was repeated with the exception that sodium bis(4-tert-butylphenyl)-phosphate having the formula:

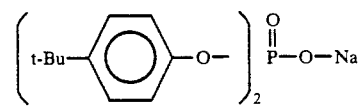

(average particle diameter: 1 μm, trade name: NA-10, produced by Adeka Augas Co., Ltd.) was used in place of PTBBA-Al. The results are shown in Table 1.

EXAMPLE 5

The same procedure as in Example 4 was repeated with the exception that the amount of NA-10 was changed to 4.5 parts by weight. The results are shown in Table 1.

EXAMPLE 6

The same procedure as in Example 2 was repeated with the exception that sodium methylenebis(2,4-di-tert-butylphenol)-acid phosphate having the formula:

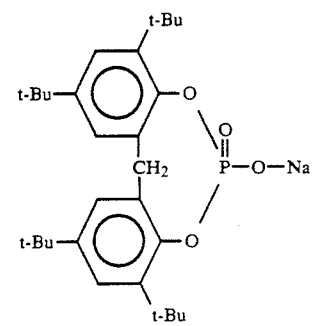

(average particle diameter: 0.8 μm, trade Name NA-11, produced by Adeka Augas Co., Ltd.) was used in place of PTBBA-Al. The results are shown in Table 1.

EXAMPLE 7

The same procedure as in Example 6 was repeated with the exception that the amount of NA-11 was changed to 4.5 parts by weight. The results are shown in Table 1.

COMPARATIVE EXAMPLE 1

The same procedure as in Example 1 was repeated with the exception that PTBBA-Al was not used. The results are shown in Table 1.

COMPARATIVE EXAMPLE 2

The same procedure as in Example 2 was repeated with the exception that bis(benzylidene)sorbitol (average particle diameter: 3 μm, trade name: EC-1. produced by E. C. Kagaku Co., Ltd.) was used in place of PTBBA-Al. The results are shown in Table 1.

COMPARATIVE EXAMPLE 3 procedure as in Example 6 was repeated with the exception that the amount of NA-11 was changed to 17 parts by weight. The results are shown in Table 1.

COMPARATIVE EXAMPLE 4

The same procedure as in Example 6 was repeated with the exception that the amount of NA-11 was changed to 0.005 part by weight. The results are shown in Table 1.

COMPARATIVE EXAMPLE 5

The same procedure as in Example 1 was repeated with the exception that the amount of PTBBA-Al was changed to 0.005 part by weight. The results are shown in Table 1.

COMPARATIVE EXAMPLE 6

The same procedure as in Example 1 was repeated with the exception that the amount of PTBBA-Al was changed to 17 parts by weight. The results are shown in Table 1.

COMPARATIVE EXAMPLE 7

The same procedure as in Example 6 was repeated with the exception that 0.5 parts by weight of NA-11 having an average particle diameter of 0.02 μm was used. The results are shown in Table 1.

COMPARATIVE EXAMPLE 8

The same procedure as in Example 6 was repeated with the exception that 0.5 parts by weight of NA-11 having an average particle diameter of 80 μm was used. The results are shown in Table 1.

REFERENCE EXAMPLE 2

Production of Polystyrene having mainly Syndiotactic Configuration

2 L of toluene as a solvent, and 5 mmol of tetraethoxytitanium and 500 mmol (as aluminum atom) of methylaluminoxane as catalyst components were placed in a reactor, and 15 L of styrene was added and polymerized at 50° C. for 4 hours.

After the polymerization, the reaction product was washed with a mixture of hydrochloric acid and methanol to decompose the catalyst components, and then dried to obtain 2.5 kg of a styrene-based polymer (polystyrene). The polymer was subjected to Soxhlet extraction using methyl ethyl ketone as a solvent to obtain 95% by weight of an extraction residue. The weight average molecular weight of the extraction residue was 800,000. A $^{13}$C-NMR analysis (solvent: 1,2-dichlorobenzene) of the polymer showed a peak at 145.35 ppm as ascribable to the syndiotactic configuration. The syndiotacticity in terms of racemipentad as calculated from the peak area was 96%.

EXAMPLE 8

100 parts by weight of the syndiotactic polystyrene obtained in Reference Example 2 and 0.5 part by weight of sodium stearate having an average particle diameter of 10 μm were melt kneaded at 300° C. to obtain a resin composition. This resin composition was evaluated in the same manner as in Example 1. The results are shown in Table 1.

EXAMPLE 9

The same procedure as in Example 8 was repeated with the exception that the amount of sodium stearate was changed to 3.0 parts by weight. The results are shown in Table 1.

EXAMPLE 10

The same procedure as in Example 8 was repeated with the exception that 2 parts by weight of NA-10 having an average particle diameter of 20 μm was used in place of sodium stearate. The results are shown in Table 1.

COMPARATIVE EXAMPLE 9

The same procedure as in Example 8 was repeated with the exception that the amount of sodium stearate was changed to 0.005 parts by weight. The results are shown in Table 1.

TABLE 1

| | Crystallization Temperature 80° C. | | Crystallization Temperature 150° C. | | Die Temperature 120° C. | |
|---|---|---|---|---|---|---|
| | $t_i$ (sec)*1 | $t_{\frac{1}{2}}^{-1}$ (sec$^{-1}$)*2 | $t_i$ (sec)*1 | $t_{\frac{1}{2}}^{-1}$ (sec$^{-1}$)*2 | Releasing Properties*3 | Appearance*4 |
| Example 1 | 1.1 | 0.49 | 1.3 | 0.78 | ○ | ○ |
| Example 2 | 1.1 | 0.53 | 1.2 | 0.94 | ○ | ○ |
| Example 3 | 1.0 | 0.56 | 1.5 | 1.01 | ○ | ○ |
| Example 4 | 1.2 | 0.51 | 1.2 | 0.88 | ○ | ○ |
| Example 5 | 1.1 | 0.54 | 1.1 | 0.90 | ○ | ○ |
| Example 6 | 1.2 | 0.49 | 1.3 | 0.80 | ○ | ○ |
| Example 7 | 1.1 | 0.52 | 1.4 | 0.84 | ○ | ○ |
| Example 8 | 1.2 | 0.32 | 1.5 | 0.58 | ○ | ○ |
| Example 9 | 1.2 | 0.38 | 1.4 | 0.67 | ○ | ○ |
| Example 10 | 1.1 | 0.53 | 1.1 | 0.90 | ○ | ○ |
| Comparative Example 1 | No crystallization | No crystallization | 5.0 | 0.15 | X | Δ |
| Comparative Example | No crystallization | No crystallization | 4.5 | 0.18 | X | Δ |

TABLE 1-continued

| | Crystallization Temperature 80° C. | | Crystallization Temperature 150° C. | | Die Temperature 120° C. | |
|---|---|---|---|---|---|---|
| | $t_i$ (sec)*1 | $t_{\frac{1}{2}}^{-1}$ (sec$^{-1}$)*2 | $t_i$ (sec)*1 | $t_{\frac{1}{2}}^{-1}$ (sec$^{-1}$)*2 | Releasing Properties*3 | Appearance*4 |
| ple 2 Comparative Example 3 | 1.0 | 0.54 | 1.1 | 0.87 | ○ | Δ |
| Comparative Example 4 | No crystallization | No crystallization | 4.0 | 0.25 | X | Δ |
| Comparative Example 5 | NO crystallization | NO crystallization | 3.2 | 0.27 | X | Δ |
| Comparative Example 6 | 1.0 | 0.58 | 1.0 | 1.02 | ○ | Δ |
| Comparative Example 7 | 2.5 | 0.22 | 3.2 | 0.30 | Δ | Δ |
| Comparative Example 8 | 2.4 | 0.11 | 4.0 | 0.32 | Δ | Δ |
| Comparative Example 9 | No crystallization | No crystallization | 2.8 | 0.19 | X | Δ |

*1 $t_i$ indicates a crystallization induction time (sec), i.e., a time taken for a crystallization nucleus to be formed at a given crystallization temperature in the crystallization of a molten resin.
*2 $t_{\frac{1}{2}}^{-1}$ indicates a reciprocal of a half crystallization time (1/sec), i.e., a reciprocal of the time taken for the degree of crystallization to reach one-half of the predetermined degree of crystallization at a given crystallization temperature.
*3 Releasing properties
○: Molding can be removed from the die by normal operation.
X: Molding cannot be removed from the die without use of a tool or application of operations such as heating.
*4 Appearance
○: No unevenness in color, no crazing, no cracking.
Δ: Unevenness in color, crazing or cracking is partially formed in the molding.

EXAMPLE 11

100 parts by weight of the syndiotactic polystyrene obtained in Reference Example 1 and 1 part by weight of the sodium salt of an ethylene-methacrylic acid copolymer (MI at 190° C.: 0.9 g/10 min) were melt kneaded at 300° C. to obtain a resin composition.

This resin composition was compression molded to a thickness of 0.3 mm at 300° C. and quenched in ice water to obtain a transparent compression molded plate.

Thereafter the same procedure as in Example 1 was repeated (the temperature of measuring the crystallization velocity was 120° C. or 150° C.). The results are shown in Table 2.

EXAMPLE 12

The same procedure as in Example 11 was repeated with the exception that sodium salt of a styrene-maleic anhydride copolymer (MI at 190° C.: 5 g/10 min) was used in place of the sodium salt of ethylene-methacrylic acid copolymer. The results are shown in Table 2.

EXAMPLE 13

The same procedure as in Example 11 was repeated with the exception that sodium salt of an ethylene-methacrylic acid copolymer (MI at 190° C.: 1.0 g/10 min) was used in place of the sodium salt of ethylene-methacrylic acid copolymer. The results are shown in Table 2.

EXAMPLE 14

The same procedure as in Example 11 was repeated with the exception that calcium salt of an ethylene-methacrylic acid copolymer (MI at 190° C.: 0.8 g/10 min) was used in place of the sodium salt of ethylene-methacrylic acid copolymer. The results are shown in Table 2.

COMPARATIVE EXAMPLE 10

The same procedure as in Example 11 was repeated with the exception that the sodium salt of ethylene-methacrylic acid copolymer was not used. The results are shown in Table 2.

COMPARATIVE EXAMPLE 11

The same procedure as in Example 11 was repeated with the exception that an ethylene-methacrylic acid copolymer (MI at 190° C.: 60 g/10 min) was used in place of the sodium salt of ethylene-methacrylic acid copolymer. The results are shown in Table 2.

COMPARATIVE EXAMPLE 12

The same procedure as in Example 11 was repeated with the exception that 30 parts by weight of the sodium salt of ethylene-methacrylic acid copolymer was used. The results are shown in Table 2.

EXAMPLE 15

100 parts by weight of the syndiotactic polystyrene obtained in Reference Example 2 and 10 parts by weight of the sodium salt of a styrene-maleic anhydride copolymer (MI at 190° C.: 5 g/10 min) were melt kneaded at 300° C. to obtain a resin composition. This resin composition was evaluated in the same manner as in Example 11. The results are shown in Table 2.

TABLE 2

| | Crystallization Temperature 120° C. | | Crystallization Temperature 150° C. | | Die Temperature 120° C. | |
|---|---|---|---|---|---|---|
| | $t_i$ (sec)*1 | $t_{\frac{1}{2}}^{-1}$ (sec$^{-1}$)*2 | $t_i$ (sec)*1 | $t_{\frac{1}{2}}^{-1}$ (sec$^{-1}$)*2 | Releasing Properties*3 | Appearance*4 |
| Example 11 | 1.1 | 0.38 | 2.6 | 0.55 | ○ | ○ |
| Example 12 | 1.0 | 0.35 | 2.6 | 0.60 | ○ | ○ |
| Example 13 | 1.0 | 0.33 | 2.4 | 0.62 | ○ | ○ |
| Example 14 | 1.0 | 0.30 | 2.2 | 0.58 | ○ | ○ |
| Comparative Example 8 | No crystallization | No crystallization | 5.0 | 0.15 | X | Δ |
| Comparative Example 9 | No crystallization | No crystallization | 5.0 | 0.18 | X | Δ |
| Comparative Example 10 | 1.2 | 0.30 | 2.4 | 0.58 | X | Δ |
| Comparative Example 15 | 1.2 | 0.30 | 2.4 | 0.52 | ○ | ○ |

*1 to *4: Same as in Table 1.

REFERENCE EXAMPLE 3

32 L of toluene as a solvent, and 1,335 mmol (as aluminum atom) of methylaluminoxane and 13.4 mmol of tetraethoxytitanium as catalyst components were placed in a reactor, and then 15 kg of styrene was added thereto.

Then the temperature was raised to 55° C., and polymerization was conducted for 2 hours. After the polymerization, the reaction product was washed with a mixture of sodium hydroxide and methanol mixture to decompose and remove the catalyst components. Then it was dried to obtain 2.1 kg of a polymer.

The polymer was subjected to Soxhelt extraction using methyl ethyl ketone as a solvent to obtain 95% by weight of an extraction residue. The polymer thus obtained had a weight average molecular weight of 400,000 and a melting point of 270° C. A $^{13}$C-NMR analysis of the polymer showed a peak at 145.35 ppm as ascribable to the syndiotactic configuration, and syndiotacticity in terms of the pentad as calculated from the peak area, was 98%.

REFERENCE EXAMPLE 4

2.3 kg of a polymer having a weight average molecular weight of 350,000 was produced in the same manner as in Reference Example 3 except that the polymerization temperature was changed to 60° C. Syndiotacticity in terms of the pentad of the polymer, was 98%.

EXAMPLE 16

69 parts by weight of syndiotactic polystyrene having a weight average molecular weight of 400,000 as obtained in Reference Example 3, 1 part by weight of talc having an average particle diameter of 0.5 μm, 30 parts by weight of glass fiber (chopped glass strand having a length of 3 mm), and 0.1 part by weight of bis(2,4-di-tert-butylphenyl) pentaerythritol di-phosphite were mixed in a rotary blender.

The resulting mixture was kneaded and extruded by two-screw extruder having an inner diameter of 30 mm, at a barrel temperature system of 270° C.-275° C.-280° C., and then pelletized. These pellets were dried at 70° C. for one day and night and molded under conditions of barrel temperature system 265° C.-275° C.-280° C., die temperature 100° to 160° C. and injection pressure 1,600 to 2,000 kg/cm$^2$ to produce a toothed wheel having a diameter of 90 mm, a thickness of 10 mm and a number of teeth of 25.

Releasing properties of the molding obtained were evaluated by the minimum cooling time at which injection molding could be carried out continuously ten times. The results are shown in Table 3.

EXAMPLE 17

A molding was produced in the same manner as in Example 16 except that the amount of the glass fiber was changed to 30.8 parts by weight and the amount of the talc blended was changed to 0.2 part by weight. The releasing properties of the molding were evaluated in the same manner as in Example 16. The results are shown in Table 3.

EXAMPLE 18

A molding was produced in the same manner as in Example 16 except that talc having an average particle diameter of 5 μm was used. Its releasing properties were evaluated in the same manner as in Example 16. The results are shown in Table 3.

EXAMPLE 19

A molding was produced in the same manner as in Example 17 except that talc having an average particle diameter of 5 μm was used. Its releasing properties were evaluated in the same manner as in Example 17. The results are shown in Table 3.

EXAMPLE 20

A molding was produced in the same manner as in Example 16 except that mica having an average particle diameter of 5 μm was used in place of the talc having an average particle diameter of 0.5 μm. Its releasing properties were evaluated in the same manner as in Example 16. The results are shown in Table 3.

COMPARATIVE EXAMPLE 13

A molding was produced in the same manner as in Example 16 except that the amount of the syndiotactic polystyrene was changed to 70 parts by weight and the talc was not used. Its releasing properties were evaluated in the same manner as in Example 16. The results are shown in Table 3.

COMPARATIVE EXAMPLE 14

A molding was produced in the same manner as in Example 16 except that talc having an average particle diameter of 60 μm was used. Its releasing properties were evaluated in the same manner as in Example 16. The results are shown in Table 3.

TABLE 3

| | Minimum Cooling Time (sec) | | |
|---|---|---|---|
| | Die Temperature 100° C. | Die Temperature 130° C. | Die Temperature 160° C. |
| Example 16 | 35 | 26 | 40 |
| Example 17 | 39 | 35 | 50 |
| Example 18 | 60 | 40 | 70 |
| Example 19 | 70 | 52 | 79 |
| Example 20 | 42 | 31 | 50 |
| Comparative Example 13 | Unremovable | 110 | Unremovable |
| Comparative Example 14 | Unremovable | 100 | Unremovable |

EXAMPLE 21

68 parts by weight of the syndiotactic polystyrene having a weight average molecular weight of 350,000 as obtained in Reference Example 4, 2 parts by weight of talc having an average particle diameter of 0.3 μm, 30 parts by weight of glass fiber (chopped glass strand having a length of 3 mm), and 0.7 part by weight of tetraquis methylene(3,5-di-tert-butyl-4-hydroxyhydrocinnamate) methane were blended and pelletized in the same manner as in Example 16.

The pellets were dried at 70° C. for one day and night, and then molded under the conditions of; barrel temperature 265° C.-275° C.-275° C., die temperature 120° C. and injection pressure 700 to 900 kg/cm$^2$ to produce an ASTM No. 1 dumbbell. Ease of formation of flash was evaluated by measuring the length of a thin piece solidified in a gas-withdrawing groove having a depth of 30 μm and width of 3 mm as graved in the die. The length of the thin piece was as small as 0.05 mm.

COMPARATIVE EXAMPLE 15

The ease of formation of flash was evaluated by carrying out the same conditions and procedure as in Example 21 except that the amount of the syndiotactic polystyrene was changed to 70 parts by weight and talc was not used. The length of the thin piece was 0.47 mm.

INDUSTRIAL APPLICABILITY

In accordance with the present invention, molding can be carried out by the use of a die maintained at a low temperature, because the crystallization rate of the resin composition is high. Moreover, molding properties are also improved, for example; the molding cycle time is shortened, releasing properties are improved, and the formation of flash at the time of molding is reduced.

Thus the resin composition of the present invention is suitable for injection molding and extrusion molding, and provides moldings which are of high crystallinity and are excellent in heat resistance, solvent resistance, chemical resistance and so forth.

The resin composition of the present invention and moldings produced using the resin composition and having characteristics as described above can be widely used as general construction materials, electric or electronic parts, can parts and so forth, and further as films, fibers, sheets and so forth.

Accordingly the present invention is of high industrial value and can be expected to be widely used.

We claim:

1. A styrene-based resin composition containing as main components (A) 100 parts by weight of a styrene-based polymer having mainly a syndiotactic configuration and (B) 0.01 to 25 parts by weight of one or more nucleating agents selected from the group consisting of sodium methylenebis(2,4-di-tert-butylphenyl) acid phosphate, sodium bis(4-tert-butylphenyl) phosphate, aluminum p-(tert-butyl) benzoate, talc, and mica.

2. The composition of claim 1, wherein said nucleating agent (B) is aluminum p-(tert-butyl) benzoate and said nucleating agent (B) is present in an amount of 0.01 to 15 parts by weight per 100 parts by weight of said styrene-based polymer.

3. The composition of claim 1, wherein said nucleating agent (B) is talc or mica and said nucleating agent is present in an amount of 0.01 to 10 parts by weight per 100 parts by weight of said styrene-based polymer.

4. The composition of claim 1, wherein said nucleating agent (B) is sodium methylenebis(2,4-di-tert-butylphenol) acid phosphate or sodium bis(4-tert-butylphenyl) phosphate and said nucleating agent (B) is present in an amount of 0.01 to 15 parts by weight per 100 parts by weight of said styrene-based polymer (A).

5. The composition of claim 1, wherein said nucleating agent (B) is talc and said nucleating agent is present in an amount of 0.01 to 10 parts by weight per 100 parts by weight of said styrene-based polymer.

6. The composition of claim 1, wherein said nucleating agent (B) is mica and said nucleating agent is present in an amount of 0.01 to 10 parts by weight per 100 parts by weight of said styrene-based polymer.

7. The composition of claim 1, wherein said styrene-based polymer having mainly a syndiotactic configuration is selected from the group consisting of polystyrene. poly(methylstyrene), poly(ethylstyrene), poly(isopropylstyrene), poly(tert-butylstyrene), poly(chlorostyrene), poly(bromostyrene), poly(fluorostyrene), poly(methoxystyrene), poly(ethoxystyrene), and mixtures and copolymers thereof.

8. The composition of claim 1, wherein said styrene-based polymer having mainly a syndiotactic configuration is selected from the group consisting of polystyrene, poly(p-methylstyrene), poly(m-methylstyrene), poly(p-tert-butylstyrene), poly(p-chlorostyrene), poly(m-chlorostyrene), poly(p-fluorostyrene), poly(p-bromostyrene), and a copolymer of styrene and p-methylstyrene.

9. The composition of claim 1; wherein said styrene-based polymer having mainly a syndiotactic configuration has a weight average molecular weight of at least 10,000.

* * * * *

UNITED STATES PATENT AND TRADEMARK OFFICE
CERTIFICATE OF CORRECTION

PATENT NO. : 5,322,869
DATED : June 21, 1994
INVENTOR(S) : Komei YAMASAKI, et al.

It is certified that error appears in the above-indentified patent and that said Letters Patent is hereby corrected as shown below:

On the title page, Item [63], in the Related U.S. Application Data, the PCT Number should read as follows:

-- PCT/JP88/01040 --.

Signed and Sealed this

Eighteenth Day of October, 1994

Attest:

BRUCE LEHMAN

*Attesting Officer*  *Commissioner of Patents and Trademarks*